United States Patent [19]

Moritz

[11] Patent Number: 5,003,665
[45] Date of Patent: Apr. 2, 1991

[54] AUTOMATIC FRONT LEG CUTTER IN A TRANSPORT SLAUGHTERING LINE

[75] Inventor: Kjell Moritz, Skanör, Sweden
[73] Assignee: Skanska Slakterimasiner, Tomelilla, Sweden
[21] Appl. No.: 285,256
[22] Filed: Dec. 16, 1988
[51] Int. Cl.⁵ .............................................. A22C 15/00
[52] U.S. Cl. .................................... 452/185; 452/149
[58] Field of Search .................. 17/44, 52, 44.2, 44.3, 17/1 R

[56] References Cited

U.S. PATENT DOCUMENTS

| | | | |
|---|---|---|---|
| 3,811,152 | 5/1974 | Herubel | 17/52 |
| 3,882,570 | 5/1975 | Zwiep et al. | 17/1 R |
| 3,916,484 | 11/1975 | Kennedy | 17/52 |

FOREIGN PATENT DOCUMENTS

| | | | |
|---|---|---|---|
| 3529205 | 2/1987 | Fed. Rep. of Germany | 17/52 |
| 222237 | 8/1968 | Sweden | 17/1 R |

Primary Examiner—Willis Little
Attorney, Agent, or Firm—Fleit, Jacobson, Cohn, Price, Holman & Stern

[57] ABSTRACT

Figure 2:
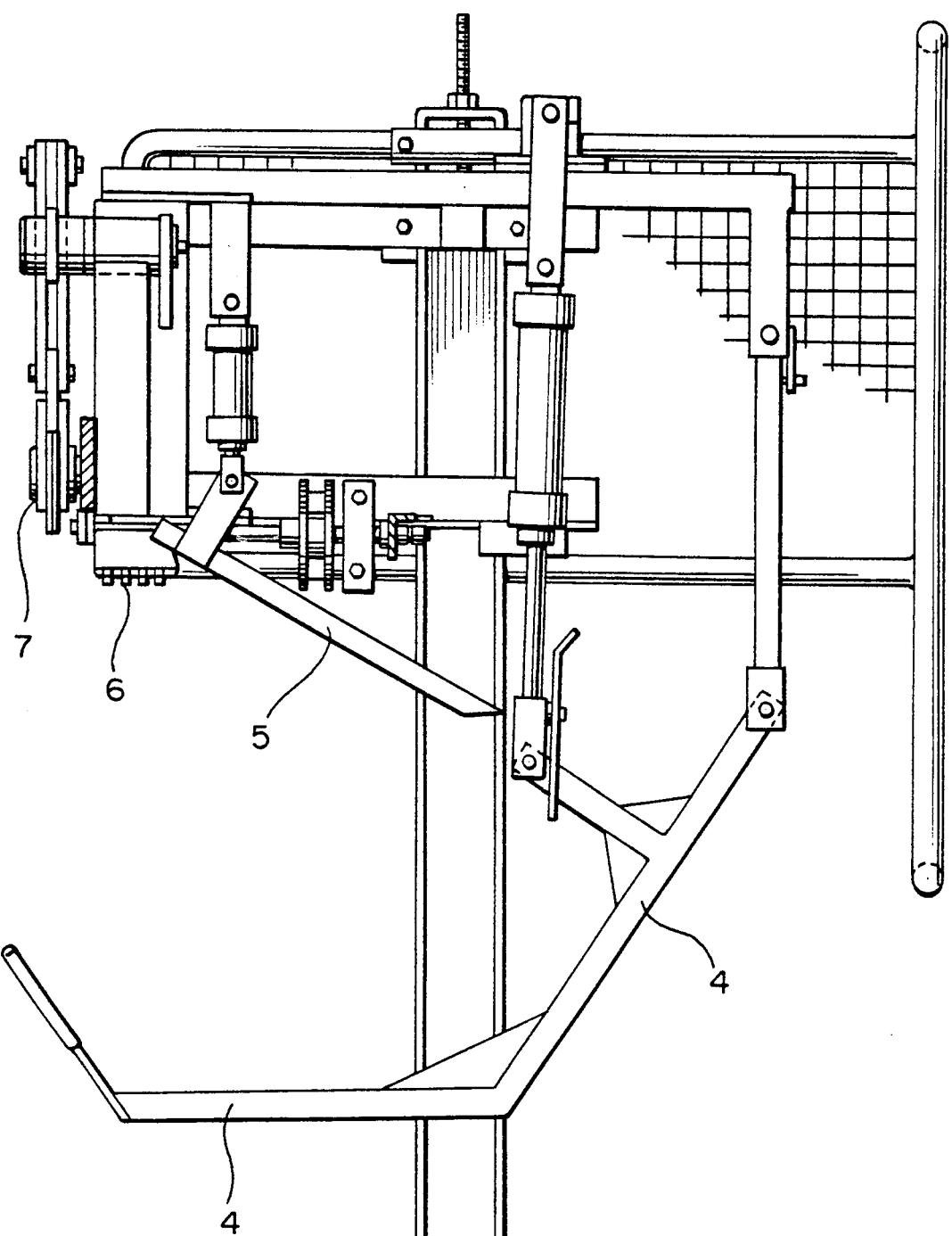

Automatic front leg cutter in a slaughtering transport line 1 <FIG. 2> where the touch of the last hind leg and the transport hook 12 on the sensitive antenna arms 10 and 11 activate two lifting arms 4 to lift up the front legs of the animal and a plate 5 for raising them into a position where the two holders 6 fall down and fix the legs while the cutters 7 cut of the front legs of the animal.

5 Claims, 4 Drawing Sheets

AUTOMATIC FRONT LEG CUTTER IN A TRANSPORT SLAUGHTERING LINE

The present invention relates to an automatic front leg cutter in a transport slaughtering line in particular for pigs. Today all work with cutting front legs on the animals are hand operated, an extremely hard work which often give rise to industrial injury. Furthermore the demands for high speed and precision in connection with cutting increase as the automation of further parts of the slaughterhouse procedure is developed.

In an automatic transport slaughtering line it is a demand that all parts in the line are continuously function without interruption. A hand operated cutting of front legs on animals in a transport slaughtering line will slow down the speed and it is hard working and with consideration of that the line is moving uninterruptedly forward the person working will experience a really restlessness moment. Accordingly, the industry aim is at an automatic system of this moment as well.

A further problem with hand operated cutting of front legs is the lack of uniformity. The size of the cutted front legs often vary and will cause problems in an automatic transport slaughtering line.

An object of the present invention is to automatically in a transport slaughtering line cut from legs of animals with a very high safty, with high precision and without interruption.

A further object of the invention is to reduce the injury of persons caused by the hand operated work and at a long sight reduce coming industrial injury.

The characteristics for the present invention will be described in the following claims.

Figure 1:
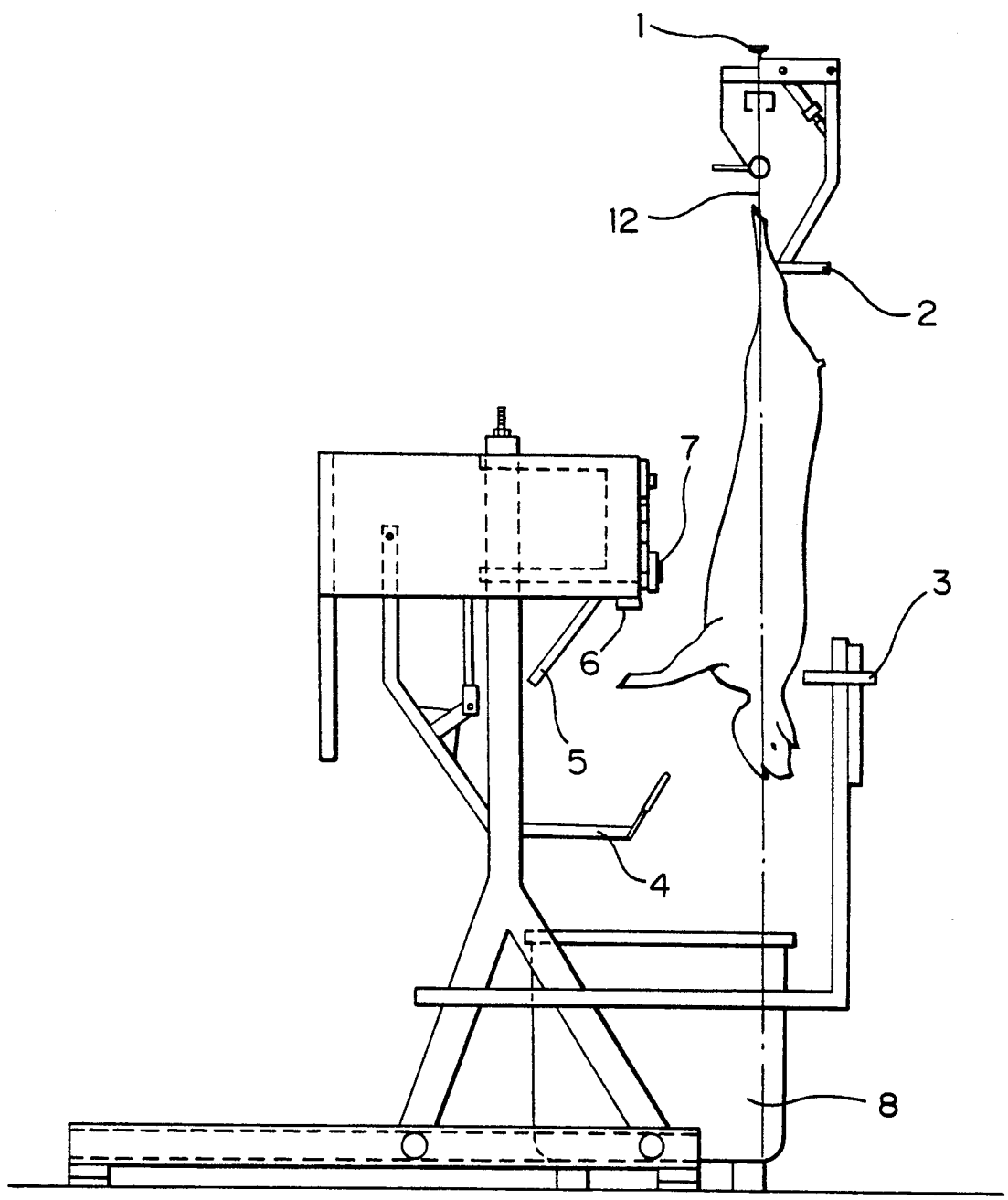
Figure 3:
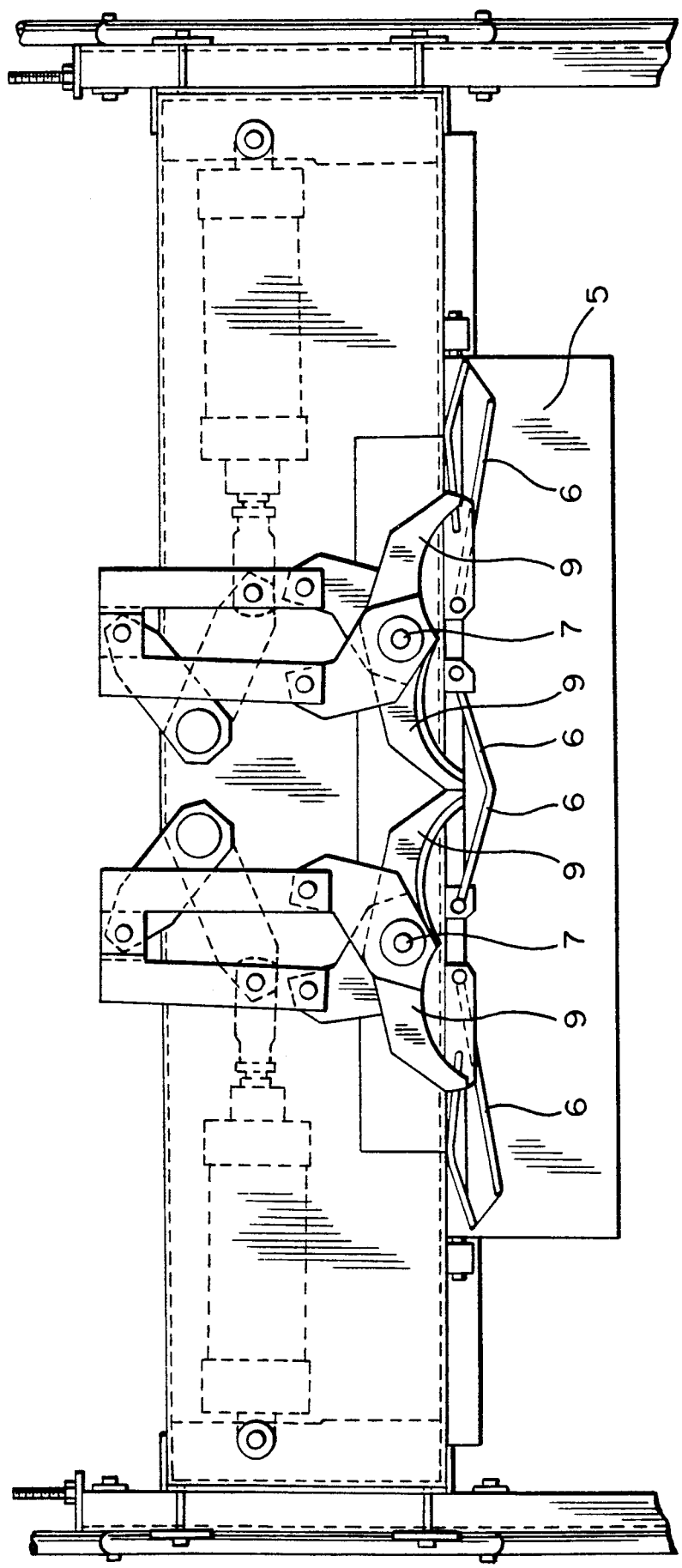
Figure 4:
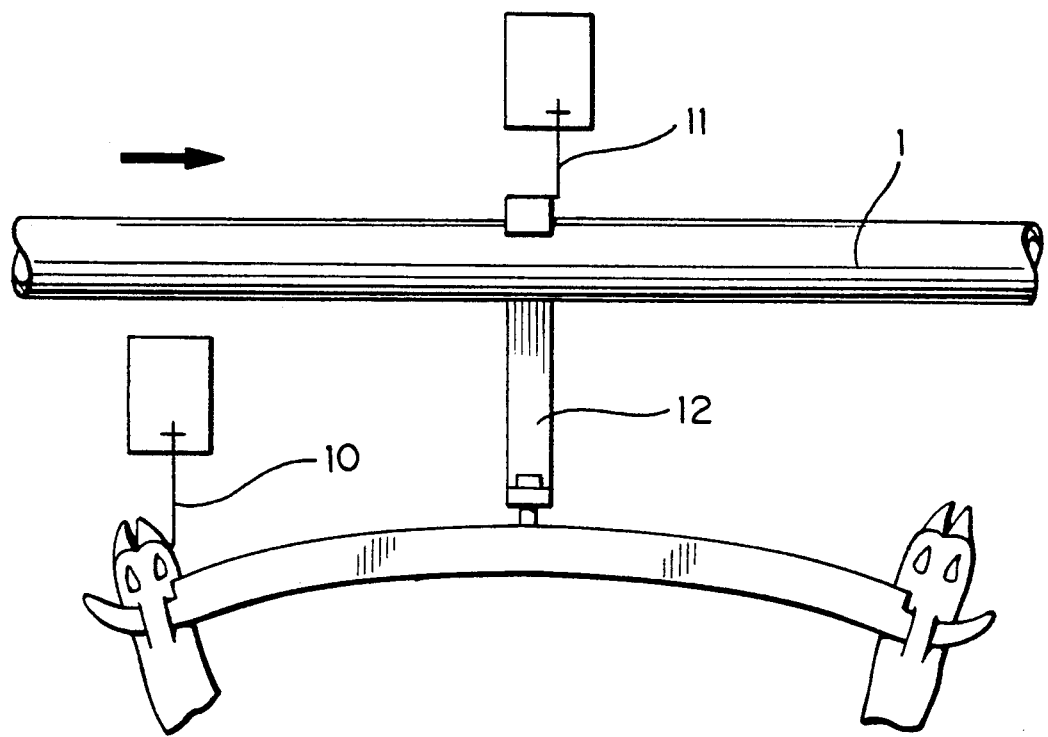

The present invention will now be further described in detail with reference to the enclosed drawings in which FIG. 1 is a side view of the invention and FIG. 2 also show the invention from the side and FIG. 3 is a front view of a part of the invention and finally FIG. 4 shows a part of the invention from the front.

FIG. 1 shows the invention from the side and an animal is forwarded in the transport slaughtering line 1 and the hind legs of the animal in the transport hook will be in close contact with an aid bar 2 and steer the animal in correct position at the same time as the neck of the animal will be in close contact with a support bar 3. When the sensitive antenna arrangement, further described in FIG. 4, start working then the both lifting arms 4 will lift up the both front legs of the animal to an upper position, where the plate 5 will lower down against the front legs and bring them forward to a, in advanced adjusted, position and thereafter two holders 6 will keep each front leg firm. In the next moment the both cutters 7 will cut off the front legs of the animal and the legs will fall down in a container 8. Thereafter all the parts in the system will return to their original position. During this process the transport slaughtering line 1 has been continuously moving slowly forward.

FIG. 2 shows the invention from the side and gives a more detailed picture of the invention and the lifting arms 4 can be seen which will raise the front legs and the plate 5 will bring them to an in advance adjusted position, where the holders 6 will fall down and keep the front legs fixed while the cutters 7 will cut off the legs.

FIG. 3 is a front view of a part of the invention and the both cutters 7 can be seen with its knife blades 9 and behind them the plate 5 is shown and the both holders 6 which will fall down and keep the legs fixed.

FIG. 4 is also a front view of the sensitive and controlling arrangement for the invention and on the transport slaughtering line 1 is seen the transport hook 12 forwarding an animal hanged in its hind legs. When the first hind leg passes the sensitive antenna arm 10 there will be no activation, but when the next hind leg of the animal passes the sensitive antenna arm 10 at the same time as the transport hook 12 passes the sensitive antenna arm 11 the system will be activated and an impulse is given which will cause the lift arms 4 to raise and the plate 5 to fall down and to lower the holders 6 and activate the cutters 7 to cut off the front legs of the animal and then return the parts to their original positions.

The invention is not limited to the construction illustrated but may vary within the scope of the following claims.

I claim:

1. Automatic front leg cutter in a slaughtering transport line comprising transporting means including a transporting hook for transporting an animal hanging by its hind legs in a slaughtering transport line, the animal constantly moving forward,
   stabilizing means for stabilizing the animal including an air bar located close to the hind legs of the animal and a support bar against the neck of the animal,
   a pair of lift arms for raising and lifting the front legs of the transported animal,
   a plate for contacting and positioning the lifted front legs of the transported animal,
   a pair of holders for fixing the positioned and lifted front legs,
   cutter means including a pair of cutters for cutting off the fixed front legs and a drive therefor, and
   sensitive antenna means activated when the automatic front leg cutter is to be operated whereupon responsive thereto the left arms raise and lift the front legs of an animal being transported by the transporting means, said plate contacts and positions the lifted front legs, said pair of holders fix the positioned and lifted front legs and the pair of cutters of the cutter means cut off the fixed front legs.

2. Automatic front leg cutter in a slaughtering transport line according to claim 1 wherein the transport means transports the hind legs of the animal with one hind leg trailing and the other hind leg leading, and the sensitive antenna means is positioned in part to be contacted by the trailing hind leg of the animal and the transporting hook for activation thereby.

3. Automatic front leg cutter in a slaughtering transport line according to claim 1, wherein the sensitive antenna means includes an inhibit to prevent activation when contacted by the leading hind leg.

4. Automatic front leg cutter in a slaughtering transport line according to claim 1 wherein the drive of the cutter means is adjustable while the cutter means is operating or at rest.

5. Automatic front leg cutter in a slaughtering transport line according to claim 1 wherein the plate, pair of holders and lift arms are each adjustable.